US 8,346,470 B2

(12) United States Patent
Geurts et al.

(10) Patent No.: US 8,346,470 B2
(45) Date of Patent: Jan. 1, 2013

(54) PROVIDING ACCESS TO A COLLECTION OF CONTENT ITEMS

(75) Inventors: Lucas Jacobus Franciscus Geurts, Eindhoven (NL); Leendert Teunis Rozendaal, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 432 days.

(21) Appl. No.: 12/667,716

(22) PCT Filed: Jul. 7, 2008

(86) PCT No.: PCT/IB2008/052720
§ 371 (c)(1),
(2), (4) Date: Jan. 5, 2010

(87) PCT Pub. No.: WO2009/007904
PCT Pub. Date: Jan. 15, 2009

(65) Prior Publication Data
US 2010/0198499 A1    Aug. 5, 2010

(30) Foreign Application Priority Data
Jul. 12, 2007   (EP) .................................. 07112317

(51) Int. Cl.
*G01C 21/00* (2006.01)

(52) U.S. Cl. ........................................ 701/408; 701/410

(58) Field of Classification Search .......... 701/408–412, 701/423–426
See application file for complete search history.

(56) References Cited

U.S. PATENT DOCUMENTS

| | | | |
|---|---|---|---|
| 6,678,609 B1 | 1/2004 | Duckeck et al. | |
| 7,132,596 B2 * | 11/2006 | Nakabo et al. | 84/615 |
| 7,720,599 B2 * | 5/2010 | Miyawaki et al. | 701/426 |
| 2003/0214582 A1 | 11/2003 | Takahashi et al. | |
| 2004/0078813 A1 | 4/2004 | Kobuya et al. | |
| 2006/0271287 A1 | 11/2006 | Gold et al. | |

FOREIGN PATENT DOCUMENTS

| | | |
|---|---|---|
| EP | 0829704 A2 | 3/1998 |
| WO | 9707467 A1 | 2/1997 |
| WO | 9808314 A1 | 2/1998 |
| WO | 0045130 A1 | 8/2000 |
| WO | 0049530 A1 | 8/2000 |

* cited by examiner

*Primary Examiner* — Richard M. Camby

(57) ABSTRACT

In a collection(2) of content items, each content item is represented by at least one signal for rendering in a perceptible form on a rendering system(5,6;25,26,27,28,29), and each content item is linked to data (8,10) specifying at least one geographical location for each content item. A method of providing access to the content items in the collection includes obtaining geographical data defining a route and assembling a signal for use by a 5 rendering system(5,6;25, 26,27,28,29), the signal being representative of a succession of signals representing a sequence of content items, so as to progress along the route as the signals representing the sequence of content items are rendered. The content items in the sequence are selected by applying at locations along the route a selection criterion based on the location along the route and the data specifying at least one geographical location for 10 each content item. The signal for use by the rendering system, when rendered, causes a speed of progression along the route to vary according to how many content items are obtained for each next location along the route by applying the selection criterion, and according to the lengths of signals representing them.

12 Claims, 3 Drawing Sheets

PROVIDING ACCESS TO A COLLECTION OF CONTENT ITEMS

FIELD OF THE INVENTION

The invention relates to a method of providing access to a collection of content items,
  each content item being represented by at least one signal for rendering in a perceptible form on a rendering system, and
  each content item being linked to data specifying at least one geographical location for each content item, including:
    obtaining geographical data defining a route; and
    assembling a signal for use by a rendering system, the signal being representative of a succession of signals representing a sequence of content items, so as to progress along the route as the signals representing the sequence of content items are rendered,
    wherein the content items in the sequence are selected by applying at locations along the route a selection criterion based on the location along the route and the data specifying at least one geographical location for each content item.

The invention also relates to a system for providing access to a collection of content items,
  each content item being represented by at least one signal for rendering in perceptible form on a rendering system, and
  each content item being linked to data specifying at least one geographical location for each content item, wherein the system is configured
    to obtain geographical data defining a route; and
    to assemble a signal for use by a rendering system, the signal being representative of a succession of signals representing a sequence of content items, so as to progress along the route as the signals representing the sequence of content items are rendered,
    wherein the content items in the sequence are selected by applying at locations along the route a selection criterion based on the location along the route and the data specifying at least one geographical location for each content item.

The invention also relates to a computer programme.

BACKGROUND OF THE INVENTION

US 2003/0214582 discloses a video delivery apparatus capable of reproducing an image stream in a way needed by the user, not depending on the speed at which the image recording vehicle was running while recording the image stream. Video information is recorded together with time information and positional information. To each recorded video information unit (frame), time information is added when the frame is recorded. Video information management means divides such pre-recorded video information into sectional video streams, each of which is associated with a specific road element. A video processing means takes in a specified route in the roadmap data and a specified moving speed, determines a position on the route based on the moving speed, and replays the video information corresponding to the position on the route.

A problem of the known method is that it is limited to recording and playback of views along a route. It is less capable of handling mixed presentations of different geographically tagged media from a variety of sources, which cannot easily be distributed evenly along a route by dividing them into sections corresponding to road sections. Examples of such media are collections of photographs associated with a particular building, a video guided tour of such a building, or an audio presentation connected with a particular point along a route.

SUMMARY OF THE INVENTION

It is an object of the invention to provide a method, system and computer programme of the types defined in the opening paragraphs that are suitable for providing access to a collection of content items linked to locations and possibly originating from a variety of sources.

This object is achieved by the method according to the invention, which is characterised by assembling a signal for use by the rendering system which, when rendered, causes a speed of progression along the route to vary according to how many content items are obtained for each next location along the route by applying the selection criterion, and according to the lengths of signals representing them.

The signal assembled may comprise a number of synchronised signals, e.g. a number of parallel streams of data having a common time base.

Because each content item is linked to data specifying at least one geographical location for each content item, it is possible to apply the selection criterion based on a location along an arbitrary route. Because, when the signals representing the selected content items are rendered, the speed of progression along the route is allowed to vary, the criterion may yield a varying number of content items, represented by signals of varying lengths, without detracting from the user experience as the signals are rendered. The content items may therefore be from varying sources, and of mixed types. In particular, there may be many content items relevant to certain locations and none relevant to other locations. Furthermore, the signals need not be partitioned into sections corresponding to route sections. If there are few or no relevant content items for certain route sections, these sections are "skipped" in a virtual sense. If there are many, the signals representing them are not rendered at too high a speed, or cut off, improving the experience for the user.

In an embodiment, geographical data defining at least a section of the route is obtained automatically in response to a user command of a type other than user input of a type that specifies any of a location and a sub-section on at least the section of the route.

Compared to, for example, geographic web layers on virtual globe programmes, this method offers a push model of providing access to geographically tagged content items, instead of a pull model. Instead of presenting clickable dots on a map, the method provides for automatic assembly of a presentation of signals representing a sequence of content items based on input other than successive clicks on points along a route. Thus, an alternative interface to the collection of content items is provided.

An embodiment includes providing a user interface for receiving user input specifying geographical locations,
  wherein the step of obtaining geographical data defining the route includes obtaining user input specifying at least one point on the route.

An effect is that less user input need be provided, since the method involves calculating a route to the point or between the points according to a set of rules.

A variant includes determining the route from user input specifying only one or both end points of the route.

An effect is that geographical data defining a complete route is derived from a minimum of user input.

In an alternative embodiment, the step of obtaining geographical data defining the route includes receiving a signal identifying successive locations of a moving navigation device.

An effect is that the method is suitable for providing a means of communication between users of the rendering system and the navigation device. The users of the navigation device can provide the users of the rendering system with information relating to their travel experiences. The method is also suitable for automatic assembly of travel information for travellers as they travel along their route, but without leading to interruptions in the rendering of signals representing content items, to skipped content items, or to pauses between content items.

An embodiment includes causing the assembled signal to be rendered concurrently with information identifying a current location as progress is made along the route, the current location being a location specified by data linked to the content item represented by a currently rendered one of the succession of signals.

An effect is to provide more information about the items in the collection of content items. This effect is useful because the speed at which progress is made "virtually" along the route varies according to how many content items are obtained for each next location along the route by applying the selection criterion, and according to the lengths of signals representing them. Therefore, the user cannot easily determine to which geographical location the content item represented by the signal currently being rendered relates. For example, the location of a moving vehicle may not be synchronised with the presentation of signals representing content items along the route being travelled by the vehicle.

A variant includes displaying a map on a screen and indicating the progression of the current position on the map displayed on the screen.

An effect is to provide information in a concise way.

In an embodiment, the step of assembling the signal includes inserting, into the signal, data based on a mix of data representative of successive ones of the signals representing the sequence of content items at a transition between signal sections representative of only the successive signals.

Thus, abrupt changeovers between successive content items of a different nature are avoided. This is especially useful where the content items comprise different media and/or are from different sources.

In an embodiment, the content items in the sequence are selected by at least conditionally applying a further selection criterion, unrelated to the data specifying at least one geographical location for each content item.

An effect is to enable the method to cope with greatly varying numbers of content items associated with locations near or on successive points of the route. This can occur when the collection of content items is, for example, assembled as a collaborative effort and made available via the Internet.

According to another aspect, the system for providing access to a collection of content items according to the invention is configured to assemble a signal for use by the rendering system which, when rendered, causes a speed of progression along the route to vary according to how many content items are obtained for each next location along the route by applying the selection criterion, and according to the lengths of signals representing them.

The system, in conjunction with the rendering system, provides a user with a kind of interaction that is relatively well suited to lean-back experiences, e.g. at home.

In an embodiment, the system is configured to carry out a method according to the invention.

According to another aspect of the invention, there is provided a computer programme including a set of instructions capable, when incorporated in a machine-readable medium, of causing a system having information processing capabilities to perform a method according to the invention.

BRIEF DESCRIPTION OF THE DRAWINGS

The invention will now be explained in further detail with reference to the accompanying drawings, in which.

DETAILED DESCRIPTION OF THE EMBODIMENTS

Figure 1:
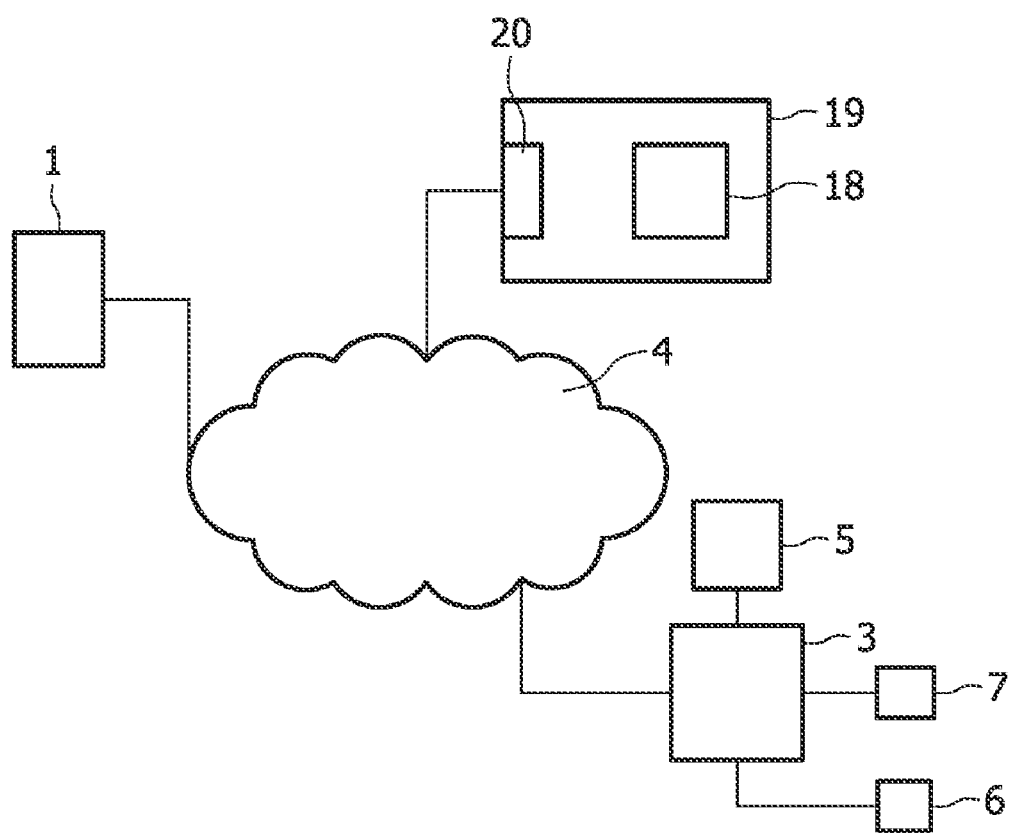
FIG. 1 is schematic diagram of a first system for providing access to a collection of content items.
Figure 2:
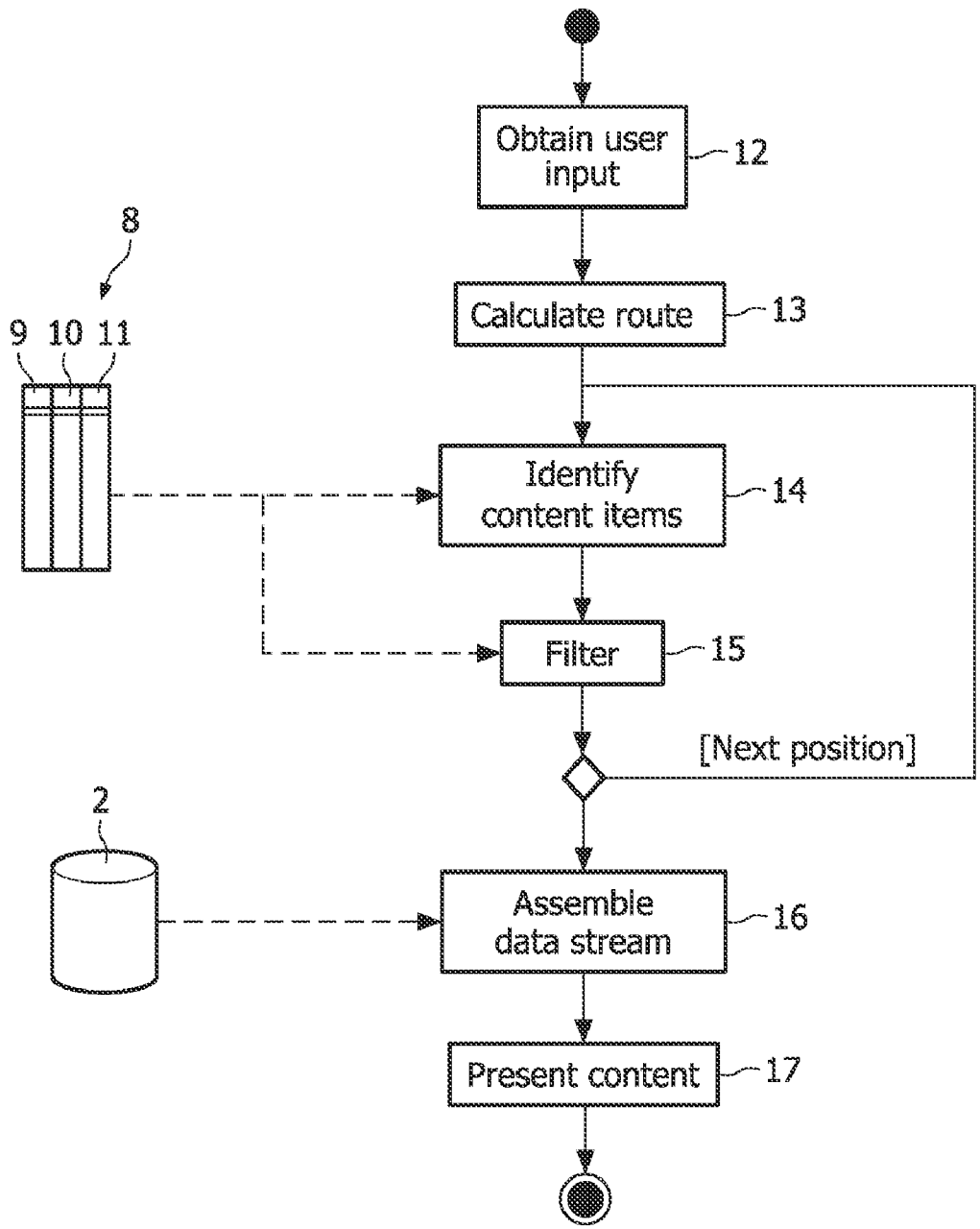
FIG. 2 is a flow chart illustrating a method suitable for the system of FIG. 1.
Figure 3:
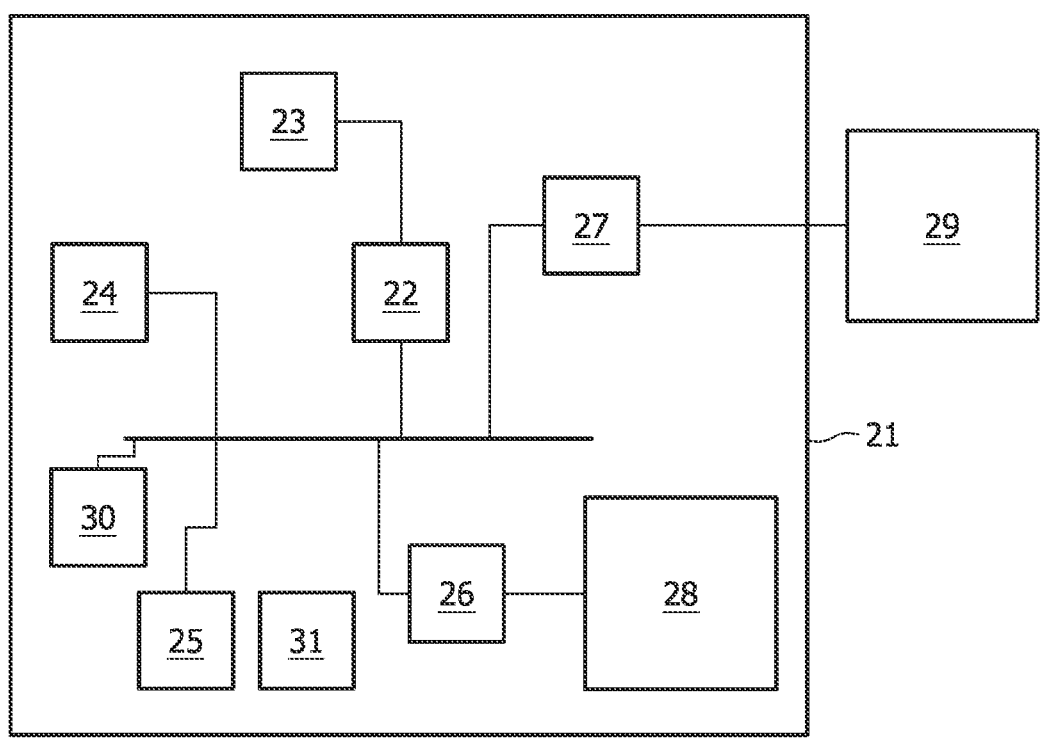
FIG. 3 is a schematic diagram of a second system for providing access to a collection of content items.

An example of a system for accessing a collection of content items is used to provide access to content items comprising files stored on a server 1. The collection of content items forms a database 2 (FIG. 2). The files comprise data forming signals representing the content items. These signals may be video, audio or image signals. The files are accessible by a user of a personal computer 3 connected to the server 1 via a network 4, e.g. the Internet. The personal computer 3 comprises a visual display unit 5, a sound system 6 and an input device 7 for providing signals representative of user input to the personal computer 3.

The files stored on the server 1 are each tagged with geographical data specifying at least one location. Web-sites for uploading tagged image files or video files are known as such. The tag is included as metadata. As an example, the files may be encoded in (X)HTML, with the geographical data being included as WGS (World Geodetic System) data in the Geo microformat. Alternatively, image files may be geocoded for example by adding the data in the GPX (GPS eXchange format) to an image file in an EXIF (exchangeable image file) format. Alternatively, the geographical data may be linked to the content items by means of a data array 8 (FIG. 2), with a first column 9 containing content item identifiers, a second column 10 containing geographical data specifying at least one location and a third column 11 including further metadata, e.g. the name of the source of the content item or a description of its contents.

Software running on the personal computer 3 provides access to the collection of content items on the server 1.

The software enables the personal computer 3 to provide a graphical user interface for receiving (step 12) user input specifying a route or end points of a route. The personal computer 3 displays a map on a screen of the VDU 5. The user may select a starting point and an end point of a route on the map using the input device 7. Subsequently, the personal computer 3 calculates (step 13) a route between the end points, e.g. the fastest, the shortest, or the most scenic route according to some heuristic encoded in the software. It follows that the section of the route between the end points is obtained in response to a user command to calculate the route, rather than by means of selections of points on the route by the user. The route calculation may alternatively be carried out by the server 1.

In a next step 14 a sequence of content items is derived by applying repeatedly, once for each of a plurality of locations on the route, a selection criterion based on the location along the route and the data in the second column 10 of the data array 8. Generally, the criterion will be a distance criterion, aimed at selecting the content items tagged with a location within a certain distance of the location on the route to which the criterion is applied. Other factors may be included, e.g. only content items to one side of the route may be considered, or the closest content item regardless of distance may be selected.

A further step 15 involves applying a further selection criterion, unrelated to the data specifying at least one geographical location for each content item. The further step 15 is omitted in some embodiments. In other embodiments, it is only applied if the preceding step 14 yields more than a certain number of content items.

Once these steps 14,15 have been applied for the succession of locations defining the route, a signal for providing visual and audible output is assembled (step 16). The signal comprises a number of synchronised signals in this case, i.e. both audio and video signals. It may be in the form of a stream of digital data or composite stream of digital data. In this step 16, the signals representing the content items selected by repeated application of the preceding two steps 14,15 are retrieved from the database 2.

In particular in the case of video or image files, standard presentation techniques, such as fade-in or fade-out may be used to create smooth transitions between photos or between video sequences. That is to say that data based on a mix of two successive content items may be inserted into the signal between the signals representing the successive content items.

Finally (step 17), the assembled signal is rendered by the personal computer 3, more particularly by the visual display unit 5 and sound system 6. As each next one of the signals representing the content items is rendered, "virtual" progress is made along the route, since each content item was selected by applying a selection criterion based on a particular location along the route. The signal assembled in the preceding step 16 comprises sections based on respective signals representing the content items selected for the succession of locations along the route at which the steps 14,15 were carried out. Thus, a "current" location can change from one section of the assembled signal to the next, as it is being rendered in perceptible form.

In an embodiment, information identifying the current (virtual) location is presented concurrently as the assembled signal is rendered. More particularly, a map may be displayed in a window on a screen of the visual display unit 5. The current (virtual) location is indicated on the map by means of an icon or similar construct. In another embodiment, the location is represented as a section of the route, which is highlighted. In another embodiment, in which the signals representing content items comprise video or image data, the map is displayed on a screen of a second visual display unit (not shown). The video or images may also be overlaid on part of the map.

A variant of the method displayed in FIG. 2 involves receiving a signal identifying successive locations of a moving navigation device 18. The navigation device 18 is comprised in a data processing system 19 for use in a moving vehicle (not shown in detail) and including a network adapter 20 providing a connection to the network 4. Thus, the step of obtaining geographical data defining a route, including receiving a signal identifying successive locations of the moving navigation device 18 replaces the first two steps 12,13 shown in FIG. 2 in this variant. The successive locations include intermediate locations between the end points of the route, in particular. The route will generally be defined by a relatively large number of locations, determined at relatively short intervals by the navigation device 18 as it travels a route not known a priori. The variant allows a user of the personal computer 3 to experience the route followed by the moving vehicle. Of course the data processing system 19 need not necessarily be placed in a moving vehicle. It may be comprised in a cellular telephone handset, for instance. It is noted that the user of the personal computer 3 will not follow the progress of the navigation device 18 in real-time, since the speed with which "virtual" progress is made along the route on the personal computer 3 varies according to how many content items are obtained for each next location along the route by applying a selection criterion in a step corresponding to step 14, and according to the lengths of signals representing the selected content items.

A similar embodiment involves the use of a second data processing system 21, including a processing unit 22, main memory 23 and GPS receiver 24, as well as a sound system 25, first and second video processing units 26,27 and main screen 28. The second video processing unit 27 forms an interface to an external display device 29. In one embodiment, the second data processing system 21 is comprised in a car navigation computer, and the external display device 29 is mountable in a position with its screen facing rear passenger seats.

A data storage device 30 includes data representative of a collection of content items, as well as data specifying at least one location for each content item. It also stores instructions enabling the second data processing system 21 to carry out a method of providing access to the collection of content items.

The GPS receiver 24 enables the second data processing system 21 to obtain a signal identifying successive locations as it moves. These are used to obtain geographical data defining a route. Steps similar to steps 14,15,16 of the method illustrated in FIG. 2 are carried out to assemble a signal which, when rendered, causes a speed of "virtual" progression along the route to vary according to how many content items are obtained for each location along the route and according to the lengths of signals stored in the data storage device 30 representing these content items.

In the case of images or image sequences, the assembled signal is provided to the second video processing unit 27 to present the images or sequences of images on the external display device 29. Concurrently, the current "virtual" position can be indicated on a map projected on the main screen 28, together with an indication of the actual position as determined using the GPS receiver 24. The actual position and the current "virtual" position will generally not coincide, except if there are few content items linked to data specifying geographical locations along a route. The current "virtual" position will always lag or at most coincide with the actual position. However, in some embodiments, it may jump ahead of the actual position in dependence on an estimate of a section of the route yet to be travelled by the second data processing system 21.

In an alternative embodiment, the method illustrated in FIG. 2 may be carried out. In this embodiment, the second data processing system 21 uses an initial location determined using the GPS receiver 24 and a destination location input by the user by means of an input device 31 to calculate a route. Thus, although data from the GPS receiver 24 is used to obtain an end point of a route, this embodiment does not involve processing a signal identifying successive locations of a moving navigation device in order to obtain geographical data defining the route. The second data processing system 21 is used both to provide directions for navigating along the route, and to render signals representative of content items associated with locations along the route. In this embodiment the "virtual" current location can also be ahead of the actual current location, as sections of the route not associated with any pertinent content items are skipped.

It should be noted that the embodiments described above illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

As an example of a variation, the method outlined in FIG. 2 may be made available as a subscribed service by the server 1, so that only the rendering of video and audio streams assembled by the server 1 is carried out by the personal computer 3.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. 'Computer program' is to be understood to mean any software product stored on a computer-readable medium, such as an optical disk, downloadable via a network, such as the Internet, or marketable in any other manner.

The invention claimed is:

1. Method of providing access to a collection of content items,
   each content item being represented by at least one signal for rendering in a perceptible form on a rendering system, and
   each content item being linked to data specifying at least one geographical location for each content item, including:
   obtaining geographical data defining a route; and
   assembling a signal for use by a rendering system, the assembled signal being representative of a succession of signals representing a sequence of content items, so as to progress along the route as the signals representing the sequence of content items are rendered,
   where the content items in the sequence are selected by applying at locations along the route a selection criterion based on the location along the route and the data specifying at least one geographical location for each content item, and the assembled signal for use by the rendering system, when rendered, causes a speed of progression along the route to vary according to how many content items are obtained for each next location along the route by applying the selection criterion, and according to the lengths of signals representing said content items.

2. Method according to claim 1, where geographical data defining at least a section of the route is obtained automatically in response to a user command of a type other than user input of a type that specifies any of a location and a subsection on at least the section of the route.

3. Method according to claim 1, including providing a user interface for receiving user input specifying geographical locations, where the step of obtaining geographical data defining the route includes obtaining user input specifying at least one point on the route.

4. Method according to claim 3, including determining the route from user input specifying only one or both end points of the route.

5. Method according to claim 1, where the step of obtaining geographical data defining the route includes receiving a signal identifying successive locations of a moving navigation device.

6. Method according to claim 1, including causing the assembled signal to be rendered concurrently with information identifying a current location as progress is made along the route, the current location being a location specified by data linked to the content item represented by a currently rendered one of the succession of signals.

7. Method according to claim 6, including
   displaying a map on a screen and
   indicating the progression of the current location on the map displayed on the screen.

8. Method according to claim 1, where the step of assembling the signal includes inserting, into the signal, data based on a mix of data representative of successive ones of the signals representing the sequence of content items at a transition between signal sections representative of only the successive signals.

9. Method according to claim 1, where the content items in the sequence are selected by at least conditionally applying a further selection criterion, unrelated to the data specifying at least one geographical location for each content item.

10. System for providing access to a collection of content items,
    each content item being represented by at least one signal for rendering in a perceptible form on a rendering system, and
    each content item being linked to data specifying at least one geographical location for each content item,
    where the system is configured:
    to obtain geographical data defining a route; and
    to assemble a signal for use by a rendering system, the assembled signal being representative of a succession of signals representing a sequence of content items, so as to progress along the route as the signals representing the sequence of content items are rendered,
    where the content items in the sequence are selected by applying at locations along the route a selection criterion based on the location along the route and the data specifying at least one geographical location for each content item, and where the system is configured to render the assembled signal such that, when rendered, the assembled signal causes a speed of progression along the route to vary according to how many content items are obtained for each next location along the route by applying the selection criterion, and according to the lengths of signals representing said content items.

11. System according to claim 10 including a navigation device for providing geographical data identifying successive locations of said navigations device when the system is in motion.

12. A computer program embodied in a non-transitory computer-readable medium for effecting the performance of a method of providing access to a collection of content items,
    each content item being represented by at least one signal for rendering in a perceptible form on a rendering system, and each content item being linked to data specifying at least one geographical location for each content item, including:

obtaining geographical data defining a route; and assembling a signal for use by a rendering system, the assembled signal being representative of a succession of signals representing a sequence of content items, so as to progress along the route as the signals representing the sequence of content items are rendered, where the content items in the sequence are selected by applying at locations along the route a selection criterion based on the location along the route and the data specifying at least one geographical location for each content item, and the assembled signal for use by the rendering system, when rendered, causes a speed of progression along the route to vary according to how many content items are obtained for each next location along the route by applying the selection criterion, and according to the lengths of signals representing said content items.

\* \* \* \* \*